(12) United States Patent
Estes et al.

(10) Patent No.: US 8,272,205 B2
(45) Date of Patent: Sep. 25, 2012

(54) CARBON DIOXIDE SEQUESTRATION IN FRESHLY MIXED CONCRETE USING THE EXHAUST FROM THE CONCRETE TRUCK

(76) Inventors: Christopher J. Estes, Waxhaw, NC (US); Liv M. Haselbach, Pullman, WA (US)

( * ) Notice: Subject to any disclaimer, the term of this patent is extended or adjusted under 35 U.S.C. 154(b) by 335 days.

(21) Appl. No.: 12/788,263

(22) Filed: May 26, 2010

(65) Prior Publication Data

US 2011/0289901 A1 Dec. 1, 2011

(51) Int. Cl.
*F01N 3/18* (2006.01)
(52) U.S. Cl. ............ 60/274; 60/292; 366/6; 366/147
(58) Field of Classification Search .......... 60/274, 60/292; 366/3, 6, 7, 10, 12, 25, 147
See application file for complete search history.

(56) References Cited

U.S. PATENT DOCUMENTS 5,244,274 A * 9/1993 Onodera ............ 366/147
* cited by examiner

*Primary Examiner* — Kenneth Bomberg
*Assistant Examiner* — Jorge Leon, Jr.

(57) ABSTRACT

A process for sequestering carbon dioxide in fresh concrete from the exhaust emitted from the combustion of carbonaceous fuel in a concrete mixing truck is disclosed. In the process, exhaust from the engine containing carbon dioxide is redirected after passing through the required environmental controls to the concrete mixing chamber on the concrete truck. This carbon dioxide is allowed to physically mix with the ingredients producing fresh concrete. When the concrete is made from cementitious material which include calcium oxide, then the carbon dioxide may chemically bind with the calcium to form calcium carbonate and be permanently sequestered in the concrete product.

9 Claims, 1 Drawing Sheet

Typical concrete mixer truck with relocated exhaust

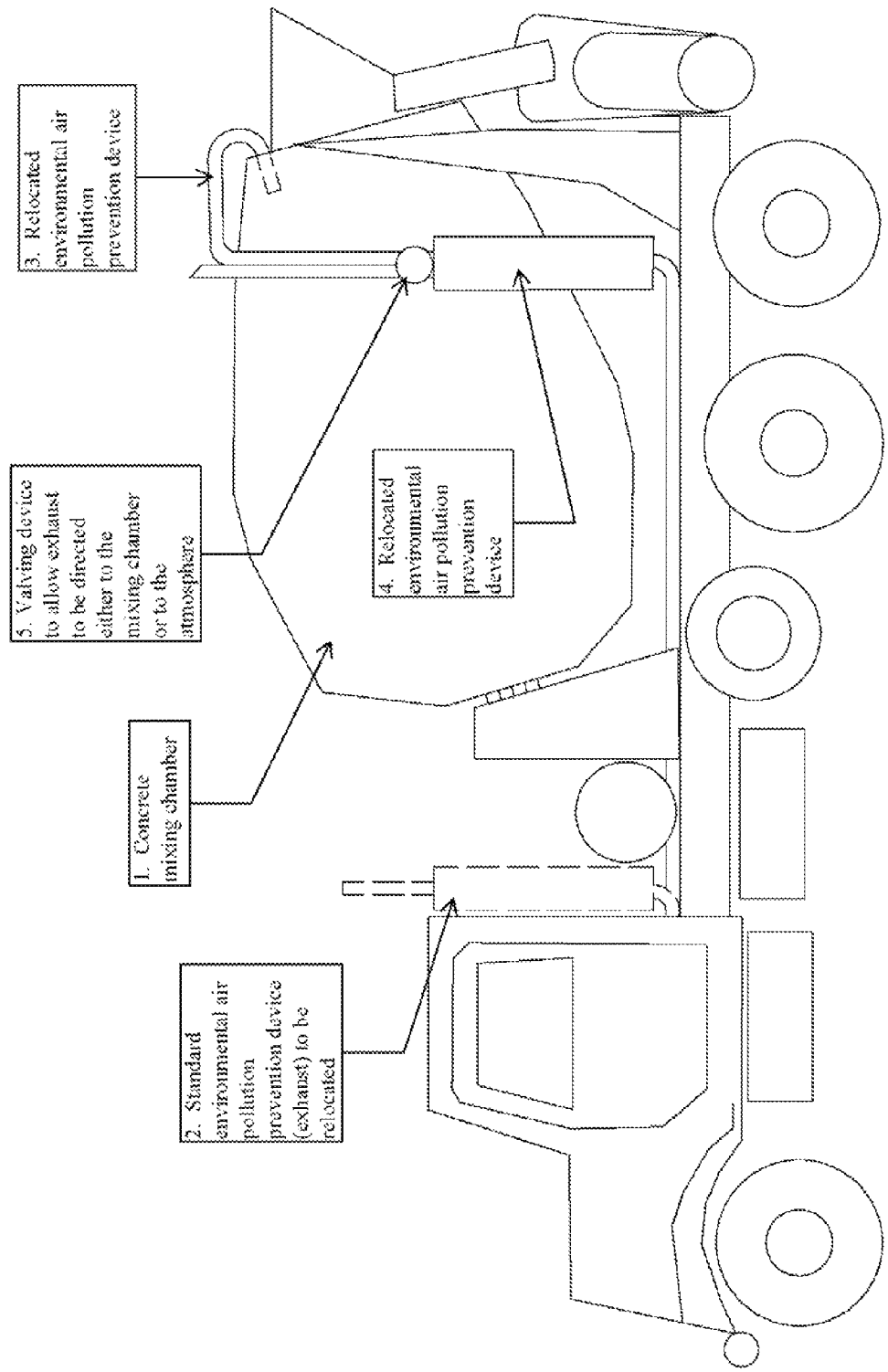

CARBON DIOXIDE SEQUESTRATION IN FRESHLY MIXED CONCRETE USING THE EXHAUST FROM THE CONCRETE TRUCK

CROSS REFERENCE TO RELATED APPLICATIONS

Not applicable

STATEMENT REGARDING FEDERALLY SPONSORED RESEARCH

Not Applicable.

BACKGROUND OF THE INVENTION

1. Field of the Invention

This invention relates to a process for sequestering carbon dioxide in concrete through the process of redirecting the exhaust from a concrete mixing truck combusting carbonaceous fuel into the mechanical mixing chamber of the truck and physically mixing with the fresh concrete.

2. Description of the Related Art

Anthropogenic carbon dioxide is being viewed as a pollutant with respect to its contribution to the levels of greenhouse gases in the atmosphere. There are many anthropogenic sources of carbon dioxide including the burning of carbonaceous fuels and the manufacture of cementitious materials containing calcium oxide using materials containing calcium carbonate as the raw material.

Sequestration of carbon dioxide from the atmosphere can occur by many biological, chemical and physical processes. One natural process of sequestration is the process called carbonation where carbon dioxide from the atmosphere chemically reacts with the calcium oxide or calcium hydroxide phases in concrete and forms calcium carbonate. This process is usually very slow and is dependent on many variables such as the concentration of carbon dioxide in the air, the age of the concrete, the availability of water, the surface area of the concrete exposed to the atmosphere, and the porosity of the concrete.

In the manufacture of concrete, the ingredients are mechanically mixed in a concrete mixing truck and exposed to the atmosphere in the process, which usually lasts for time periods measured in hours. However, the concentration of carbon dioxide is low, measured in the units of a few hundred parts per million. Therefore, there is little opportunity for substantial amounts of carbon dioxide to be reabsorbed and sequestered into the concrete mix during the short mixing period.

It has been reported that in 2000, carbon dioxide emissions reached 5.8 billion metric tons and that approximately 80% of annual emissions come from the burning of fossil fuels. Therefore, there have been efforts to limit man made carbon dioxide emissions from fossil fuel burning plants. U.S. Pat. No. 6,235,092 provides a discussion of a variety of processes that have been developed for removing a gaseous component (such as carbon dioxide) from a multicomponent gaseous stream (such as the exhaust gas stream of a coal burning electrical power generation plant). Selective adsorption by solid adsorbents and gas absorption are named as two example processes. This patent further mentions that gas absorption finds use in the separation of carbon dioxide from multicomponent gaseous streams. Other patents describing carbon dioxide sequestration methods include U.S. Pat. Nos. 6,648,949, 6,372,023 and 5,397,553.

Although these processes may be successful in-sequestering carbon dioxide, they can be energy intensive. Thus, there is continued interest in the development of less energy intensive processes for sequestering carbon dioxide from the exhaust gas streams from the combustion of carbonaceous materials. Patent Ser. No. 12/571,398 uses the carbon dioxide from an exhaust stream but for preformed concrete applications, not ready-mixed.

It is also known that the hardening of cement-containing materials can be accelerated by carbonation in which calcium hydroxide in the cement is transformed into calcium carbonate by absorbing carbon dioxide. Related processes are described in U.S. Pat. Nos. 6,387,174, 6,264,736, 5,965,201, 5,897,704, 5,690,729, 5,650,562, 5,518,540, 5,307,876, 5,051,217, 4,427,610, 4,362,679, 4,350,567, 4,117,060, 4,093,690 and 4,069,063, German patent application DE 4207235, Swiss patent application CH 644828, and Japanese patent applications JP 6263562 and JP 2018368.

SUMMARY OF THE INVENTION

The foregoing needs are met by a process according to the invention for sequestering carbon dioxide from the exhaust of a concrete mixing truck into freshly mixed concrete. This process would redirect the exhaust from concrete mixing trucks which use carbonaceous fuels to the concrete mixing chamber where the fresh concrete is being mechanically mixed. The carbon dioxide would be physically entrained in the mix. Cementitious materials in the fresh concrete which contain calcium oxide or calcium hydroxide would then chemically react to form calcium carbonate, a solid which may permanently sequester carbon dioxide within the solid concrete matrix.

The exhaust from the burning of carbonaceous fuels in a concrete mixing truck has concentrations of carbon dioxide which are substantially greater than ambient concentrations, orders of magnitude greater. If these exhausts are combined in the concrete mixing truck with the fresh concrete raw materials while being mechanically mixed, then there will be a greater availability of carbon dioxide for sequestering into the freshly mixed concrete during the production process. This process would not have substantial energy needs other than that already required for the production of concrete.

It is therefore an advantage of the present invention to provide products and processes that make environmentally beneficial use of the carbon dioxide in the exhaust from a concrete mixing truck, permanently sequestering substantial amounts within the concrete product.

These and other features, aspects, and advantages of the present invention will become better understood upon consideration of the following detailed description, drawings, and appended claims.

BRIEF DESCRIPTION OF THE DRAWINGS

FIG. 1 is a schematic showing an example relocated exhaust from a concrete mixing truck which would allow the carbon dioxide in the exhaust to be directed into the fresh concrete mix.

DETAILED DESCRIPTION OF THE INVENTION

Turning to FIG. 1, there is shown an example process according to the invention. In a first step, exhaust gas is transported from a combustion chamber of the truck engine. The gas source may be an exhaust pipe or other convenient location where gas is emitted from the combustion chamber.

The exhaust is then redirected into the mixer of the truck and mixed with the fresh concrete ingredients allowing for the carbon dioxide in the exhaust to be sequestered in the concrete by the process of carbonation. While the example process is typically used in the context of exhaust generated by a combustion engine, it is not limited to such applications.

Thus, the invention provides products and processes that make environmentally beneficial use of the carbon dioxide produced as by-products of combustion engines of the concrete trucks. In the process, carbon dioxide is produced as exhaust from the combustion of carbonaceous fuel, and the exhaust carbon dioxide is introduced into the mixing chamber of the concrete truck. The carbon dioxide in the exhaust gas reacts with hydration products in the cementitious material which in turn sequesters the carbon dioxide.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A process for producing concrete in a concrete mixing truck, the concrete mixing truck including an internal combustion engine which produces an exhaust gas containing carbon dioxide; an exhaust pipe; and a mixing chamber containing a premixture of primary fresh concrete ingredients, the process comprising:
    directing the exhaust gas from the internal combustion engine into an inlet of the mixing chamber via the exhaust pipe,
    introducing the exhaust gas into the premixture of primary fresh concrete ingredients during a mixing process in the mixing chamber, and
    allowing the carbon dioxide from the exhaust gas to be physically mixed with and sequestered into a fresh concrete mixture.

2. The process of claim 1 wherein, the mixing process includes mechanically mixing the fresh concrete mixture in the mixing chamber.

3. The process of claim 1 wherein, the mixing chamber is open to the atmosphere.

4. The process of claim 2 wherein, the premixture of primary fresh concrete ingredients includes a cementitious material containing calcium oxide.

5. The process of claim 3 wherein, the internal combustion engine combusts a carbonaceous fuel.

6. The process of claim 5 wherein, the introducing the exhaust gas includes introducing the exhaust gas exiting an exhaust gas purification device disposed in the exhaust pipe downstream from the internal combustion engine and upstream from the inlet of the mixing chamber.

7. The process of claim 6 wherein, the exhaust gas purification device is disposed proximate to the inlet of the mixing chamber.

8. The process of claim 6 wherein, the directing the exhaust gas includes dividing the exhaust pipe downstream from the exhaust gas purification device into a first tail pipe leading to the inlet of the mixing chamber and a second tail pipe leading to the atmosphere.

9. The process of claim 8 wherein, the directing the exhaust gas includes selectively directing the exhaust gas into the first tail pipe or the second tail pipe by controlling a valve disposed at an intersection of the first tail pipe and the second tail pipe.

* * * * *